(12) United States Patent
Slosar et al.

(10) Patent No.: US 10,970,480 B1
(45) Date of Patent: Apr. 6, 2021

(54) METHOD AND SYSTEM FOR CONTENT MANAGEMENT FOR RESUME GENERATION

(71) Applicant: HIVE DIVERSITY, INC., New York, NY (US)

(72) Inventors: Byron Kantrow Slosar, New York, NY (US); Federico Halperin, Aventura, FL (US); Sam Kantrow, New York, NY (US)

(73) Assignee: HIVE DIVERSITY INC., New York, NY (US)

( * ) Notice: Subject to any disclaimer, the term of this patent is extended or adjusted under 35 U.S.C. 154(b) by 0 days.

(21) Appl. No.: 17/066,241

(22) Filed: Oct. 8, 2020

(51) Int. Cl.
| | |
|---|---|
| *G06F 40/186* | (2020.01) |
| *G06F 40/174* | (2020.01) |
| *G06F 40/137* | (2020.01) |
| *G06F 3/0483* | (2013.01) |
| *G06F 3/0482* | (2013.01) |
| *G06F 40/106* | (2020.01) |

(52) U.S. Cl.
CPC .......... *G06F 40/186* (2020.01); *G06F 3/0482* (2013.01); *G06F 3/0483* (2013.01); *G06F 40/106* (2020.01); *G06F 40/137* (2020.01); *G06F 40/174* (2020.01)

(58) Field of Classification Search
CPC .... G06F 40/137; G06F 40/106; G06F 40/174; G06F 3/0482; G06F 3/0483; G06F 40/186
See application file for complete search history.

(56) References Cited

U.S. PATENT DOCUMENTS

| | | | | |
|---|---|---|---|---|
| 5,633,996 | A * | 5/1997 | Hayashi | G06F 40/103 715/246 |
| 10,387,839 | B2 | 8/2019 | Wehrle et al. | |
| 2002/0065852 | A1* | 5/2002 | Hendrickson | G06F 40/103 715/236 |
| 2007/0300148 | A1 | 12/2007 | Aniszcyzk et al. | |

(Continued)

OTHER PUBLICATIONS

Resume Builder—CV Maker, OQ4Dev, https://play.google.com/store/apps/details?=com.oq.resume.cv&hl=en_US, Version 2.6, Updated Apr. 8, 2020.

(Continued)

*Primary Examiner* — Kyle R Stork
(74) *Attorney, Agent, or Firm* — Bechen PLLC; Timothy J. Bechen

(57) ABSTRACT

A computerized method and system for electronic management of input content provides for resume generation. The method and system determines section lines for each of multiple content sections of the resume. Therein, field lines are determined for each field within the content section, including dividing up the number of section lines amongst the plurality of fields. The method and system updates an electronic user interface indicating fields and number of lines for each of fields. Via the user interface, the method and system includes receiving user input for each of the plurality of fields and tracking the user input for each of the plurality of fields relative to the number of field lines for each of the plurality of fields. Thereby, the method and system manages resume generation by interacting with the user to modify the user input and available field lines, as well as updating corresponding content sections.

20 Claims, 8 Drawing Sheets

(56) References Cited

U.S. PATENT DOCUMENTS

2013/0339262 A1* 12/2013 Almatrouk ......... G06Q 10/1053
  705/321
2019/0012307 A1* 1/2019 Ling ..................... G06Q 50/01
2019/0138645 A1 5/2019 Zhang et al.
2020/0051033 A1 2/2020 Korayem et al.

OTHER PUBLICATIONS

Optimal Resume Buidler Help—Optimal 2.0 Edition, OptimalResume. com, https://www.illinoisworknet.com/partners/EPIC/Documents/Optimal%20Resume%20Builder%20Help.pdf, Aug. 7, 2020.
How to Use Novoresume—My Professional Resume Builder, Andrei Kurtuy, https://novoresume.com/career-blog/how-to-use-noveresume, Jul. 15, 2017.

* cited by examiner

```
┌─────────────────────────────────┐
│           TOOLBAR                │
├─────────────────────────────────┤
│ EXPERIENCE                       │
│ PROFESSIONAL                     │
│ ━━━━  ════  ════  ════  ════ ════│
│  ╭───────────────────────────╮  │
│  │                           │  │
│  │      NUMBER OF            │  │
│  │    PROFESSIONAL           │  │
│  │  PROFESSIONAL EXPERIENCES │  │
│  │                           │  │
│  │                           │  │
│  │  ① ② ③ ④ ⑤ ⑥            │  │
│  │                           │  │
│  ╰───────────────────────────╯  │
│                                  │
│     PROFESSIONAL EXPERIENCES     │
│                                  │
│  --- DESCRIPTION OF TYPES OF     │
│     EXPERIENCES TO INCLUDE ---   │
└─────────────────────────────────┘

FIG. 6

┌─────────────────────────────────┐
│           TOOLBAR                │
├─────────────────────────────────┤
│ EXPERIENCE                       │
│ PROFESSIONAL                     │
│ ━━━━ ━━━━ ════ ════ ════ ════    │
│  ╭───────────────────────────╮  │
│  │     PROFESSIONAL          │  │
│  │     EXPERIENCE #1         │  │
│  │                           │  │
│  │     EXPERIENCE TITLE      │  │
│  │   _____     │  │
│  │       INDUSTRY            │  │
│  │   _____     │  │
│  │       POSITION            │  │
│  │   _____     │  │
│  │                           │  │
│  │         LOCATION          │  │
│  │   STATE         CITY      │  │
│  │   _____       _____     │  │
│  │                           │  │
│  │  START DATE    END DATE   │  │
│  │   MONTH          MONTH    │  │
│  │   _____        _____    │  │
│  │   YEAR           YEAR     │  │
│  │   _____        _____    │  │
│  ╰───────────────────────────╯  │
└─────────────────────────────────┘
```

FIG. 7

METHOD AND SYSTEM FOR CONTENT MANAGEMENT FOR RESUME GENERATION

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

FIELD OF INVENTION

The present invention relates generally to document and content generation and more specifically to interactive content management for electronically building a resume.

BACKGROUND

For most people, their resume is based upon years of hard work acquiring skills, experiences, and qualifications. Overlooking the nuances and intricacies of a high quality resume subverts those efforts.

Complications arise with current techniques for resume generation. Resume building software opts for over-inclusion of content creating disruptively long resumes.

U.S. Publication No. 2002/0065852 notes the common solutions of online content, using style sheets to create a resume web page with user questions for eliciting resume content and headings and sub-headings for content structure. This solution literally favors style over substance. With unlimited spacing, online resumes drown beneficial content in a sea of unnecessary verbiage.

Resume building has benefited from executable software assisting data compilation. For example, an online software application entitled Optimal Resume Builder is available from ThinkOptimal of Cary, N.C. This Resume Builder software provides interactive software for electronically building a resume, including resume sections and adding content for different sections. The Resume Builder software can use an existing template, the user entering content in designated locations.

The Resume Builder software represents the existing problems of the current prior art. The software is about generally giving the user direction and format for generating content, but lacks instructions for how to manage said content. It is only after data entry does the user know if they entered too much or too little content.

The prior art software proposes the structure of formatting, e.g. styles and layout, but omits content management. For example, if the user enters too many experience fields, the software simply extends the experience section, simply making the online resume longer.

The user, upon finding the experience section too long, then deletes the content, losing the work product. This becomes an iterative process as the user writes, deletes, and re-writes sections.

The prior art solutions offer unlimited spacing for content and lack interactive management of input content. For many situations, a one-page resume is the standard acceptable document. As such, there exists a need for a method and system for content management for resume generation.

BRIEF DESCRIPTION

The present invention uses an innovative combination of computing algorithms via executable software processing operations, user interfacing, and data management operations for managing user content including generating a resume.

Structurally, a resume is divided into content sections, each content section having unique content. For example, content sections may include contact information, education, work experience, interests, etc. Spacing restrictions limit the scope of content written in these sections. The present method and system manages content in these sections and the user interaction addressing spacing restrictions. Electronic management of input content is via interactive user interface elements and backend processing routines.

The method and system includes determining a number of section lines within each of the content sections. The number of lines can be controlled by preset spacing requirements. For one page resume formats, the resume itself has a limited number of total lines, that total number of lines is then divided amongst the content sections.

Each content section is further sub-divided into a number of fields. For example, a Professional Experience section of a resume has separate fields for each unique work experience. Thus, in each content section, the number of available lines per content section is broken down further by the individual fields. The number of available lines in the content section can also be predetermined, either in a specific number of lines or a range of available lines, based the specific content section, such as a standardized formatting for one or more content sections.

The method and system includes determining a number of field lines for each of the fields. This field-specific line designation can be determined using further interactive elements in the user interface with back-end programming routines. Further embodiments may utilize input from third-party resources, such as educational experts, human resources experts, etc.

For example, if a content section allows for 15 lines of text, the section line number has a value of 15. If the content section has 4 unique fields, this could represent four different work experiences. The section line number of 15 is then subdivided amongst the 4 unique fields. In the first instance, the first 3 fields can be assigned 4 lines of text and the fourth field can be assigned 3 lines of text. Or via user interface functionality, the user can answer questions allowing for processing routines to electronically determine spacing. Any suitable original distribution may be utilized, including accounting for industry-standard headings and industry-standard content volume.

The method and system operates the user interface for data collection with formal resume creation done at a later stage. As the number of sections and lines per section are assigned, the user interface updates the display. Using the above example, the user interface can display four separate fields in the content section, noting the first three fields having four lines of text and the fourth field having three lines of text, of the example of 15 content lines.

The method and system receives user input for each of the various fields. Again, the user input can be received via interactive content via the user interface, such as a questionnaires, pull-down menus, bullet points, auto-fill language, links to suggested language, etc.

The method and system tracks the user input for each of the plurality of fields relative to the number of field lines for each field. For example, as the user enters written descriptions, the method and system tracks the numbers of written characters, translating the number of characters into a number of lines. The method and system maintains knowledge of the amount of content being generated relative to the space available in the resume.

The method and system manages the electronic generation of a computer-generated resume by interacting with the user via the user interface to modify the user input and adjust the number of field lines for one or more of the fields. Managing the content generation includes tracking the number of characters and translating these characters into line-specific content.

As the user enters descriptions in the fields, the user interface interacts to assist managing spacing by updating the number of submitted lines of text compared with the available number of lines. This management can operate at both a per field level and at a content section level, actively tracking spacing in the resume. As the user enters written content, the user can actively see the amount of space available per field per content section.

The method and system updates the content section of the computer-generated resume based on the modification of the user input and adjusting the number of lines. For example, if the interface notes a first field has too much content filling 5 lines but is only allocated 4 lines, the user can revise the written description to fill the 4 lines or can increase the available lines in the first field by reducing another field by 1 line.

Further interactivity allows for content modification without rewriting the resume. For example, via the user interface, the prioritization of fields within the content section can be adjusted or re-ordered. In another example, the number of lines per field can be modified and then further content added or deleted as necessary. As line numbering is changed, discarded user content can be deemed inactive, saved but not visible, and thus usable for later re-insertion without requiring the user to redraft.

Additional activity may include adding a further section, e.g. another work experience, without requiring reconstruction of the resume. For example, the user via the user interface can, space permitting, add another section and adjust the total number of lines for this content section accordingly.

The user interface can further operate via decision trees, guiding the user at all stages of the resume creation. The spacing and number of fields can be performed for each of the content sections, allowing the user to focus on content insertion with the user interface and processing algorithm to focus on spacing and formatting.

Upon completion of data entry, the method and system can then generate the formatted resume consistent with the user interface instructions. The formatted resume can be in an electronic format, such as a postscript or image file, available for electronic distribution. Similarly, the formatted resume can be printed to generate a physical copy.

Further resume content can be made available via an electronic platform, management of the content providing a higher quality and more readable work product. The electronic platform can include means to download or otherwise access the pre-formatted resume, e.g. a one-page resume, the resume content then matching the content on the electronic platform.

BRIEF DESCRIPTION OF THE DRAWINGS

FIGS. 6-13 illustrate sample screenshots of the user interface for electronic management of input content for a computer-generated resume.

A better understanding of the disclosed technology will be obtained from the following detailed description of the preferred embodiments taken in conjunction with the drawings and the attached claims.

DETAILED DESCRIPTION

Figure 1:
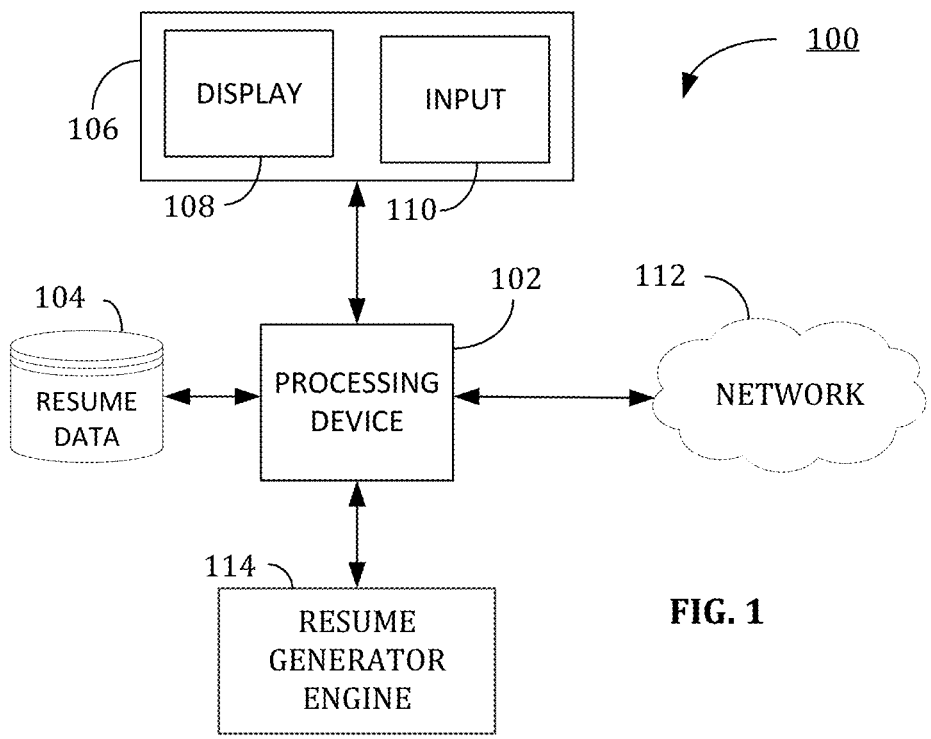
FIG. 1 illustrates one embodiment of a processing system for generating a resume.

FIG. 1 illustrates a processing system 100 providing for electronic management of input content for a computer generated resume. A database 104 stores resume data. The system 100 further includes a user interface 106 including a display 108 and an input device 110. The processing device 112 is connected to a network 112.

The processing device 102 may be one or more processing elements performing processing operations in response to executable instructions stored in a computer readable medium. The processing device 102 can be a stand-alone processing unit or can be in a distributed computing environment across any number of processors.

In one embodiment, the processing device 102, database 104 and user interface 106 can be within a mobile computing device, such as a mobile phone, tablet computer, laptop or desktop computer. The database 104 can be one more memory locations storing data, including resume data and additional user information as part of the resume assembly processing routine.

The user interface 106 can include additional processing as necessary for input and output functions. In the example of a mobile device, the display 108 can also be the input 110 in the form of a touch screen. In another example, the display 108 can be a computer monitor and speakers, the input 110 keyboard and mouse.

The network 112 can be any suitable network connection, such as an Internet connection or a private network, intranet. Communication across the network 112 may be via third-party connections, such as a wireless hot-spot connecting to a network router. Communication across the network 112 may be in accordance with known network communication technology.

Figure 2:
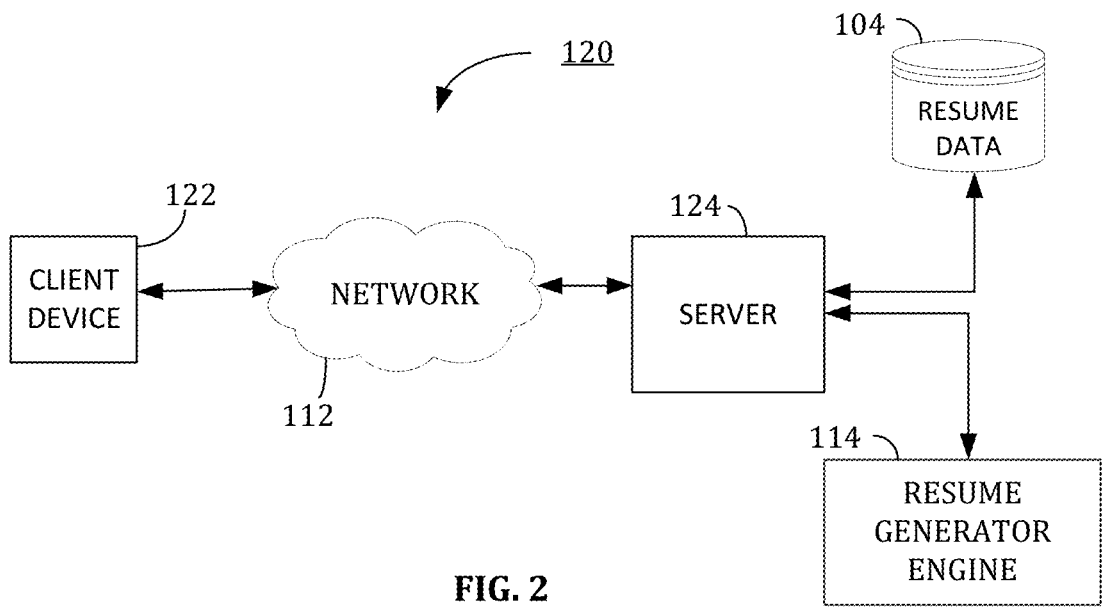
FIG. 2 illustrates another embodiment of a processing system for generating a resume.

The processing device 102 performs processing operations for generating the resume consistent with the resume generator engine 114. The engine 114 may be disposed within the processing device 102 or can be a stand-alone process module. The engine 114 includes processing instructions for guiding the user interface functionality and input content management as described herein.

Where FIG. 1 illustrates a local processing environment, FIG. 2 illustrates an embodiment with the user interactivity across a networked connection. In this embodiment, the processing system 120 includes a client device 122 communicating with a server 124 across the network 112. The server 124 further engages the resume generator engine 114 and resume database 104.

The client device 122 can be any suitable local computing device with functionality of executing user interface elements. For example, the client device can be a local computer or computing device running an application or a web browser for locally interfacing and communicating with the server 124. In the example of a computer, the device 122 can use a keyboard, camera, and mouse for input, with a screen and speakers as output.

The server 124, engine 114, and database 104 can be disposed in a single location or across a distributed environment, such as a cloud-based operating system. These elements perform processing operations guiding the user interface functionality and input content management as described herein.

Figure 3:
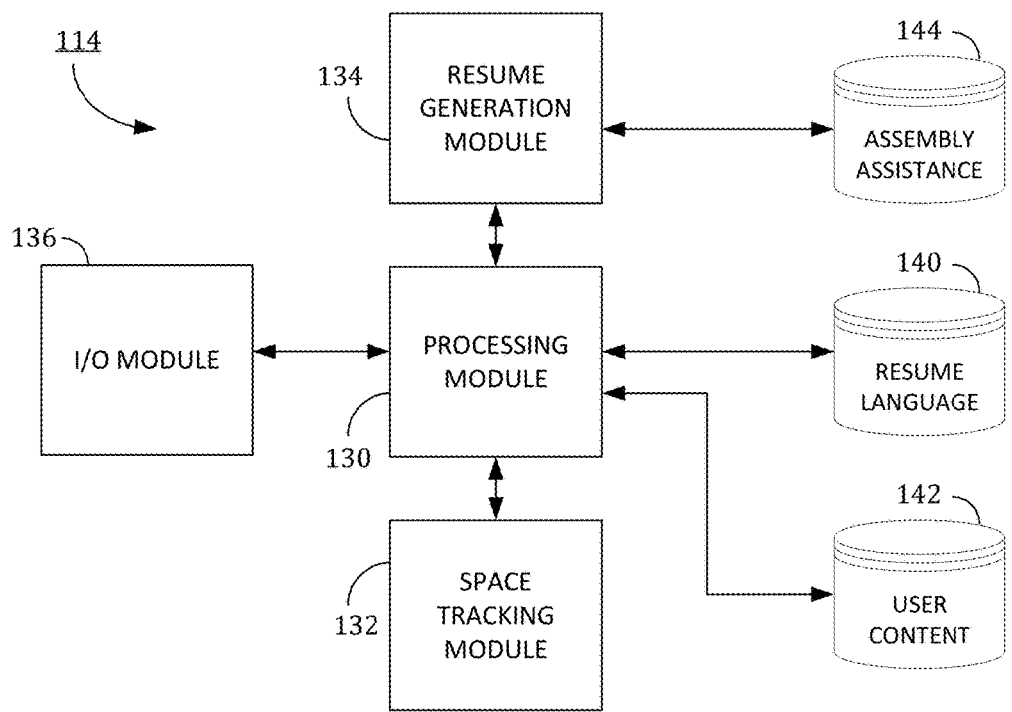
FIG. 3 illustrates one embodiment of processing modules for electronic generation of a resume via a user interface and data management therewith.

FIG. 3 illustrates a further display of one embodiment of processing structure electronic management of input content for a computer-generated resume. FIG. 3 illustrates an expanded view of the resume generator engine 114 executed within the systems of FIGS. 1 and 2 above.

The engine 114 includes multiple processing modules, including a processing module 130, a space tracking module 132, a resume generation module 134, and an input/output (i/o) module 136. The processing module 130 accesses a resume language database 140 and a user content database 142, the resume generation module 134 accesses an assembly assistance database 144.

As described in greater detail below, the processing module 130 manages the operations for resume generation. The space tracking module 132 operates to establish, actively track, and modify content spacing during resume generation. The resume generation module 134 includes interactive elements and additional functions for guiding the user during the creation and data entry process. The i/o module 136 facilitates output to the user as well as managing user input.

The resume language database 140 can include pre-existing resume language. The user content database 142 stores user entered information on an on-going basis. As users update and revise resume language, the database 142 can maintain various iterations of content, avoiding costly user rewrites.

The assembly assistance database 144 can include any number of assistance content usable by the resume generation module 134 for assisting resume creation. Assistance content can include instructional videos, guided videos, interactive questionnaires, by way of example.

As part of the computerized method, the resume generation accounts for the available spacing within a resume. The present method operates for a defined space, such as a one-page resume. Where the present discussion uses the one-page resume as an example, the present method and system is not explicitly limited to a one-page resume. For example, spacing limitation can be one page, two pages, or even one page and a fraction of a second page. The method and system operates by facilitating user entry and managing content for the space-limited content.

Figure 4:
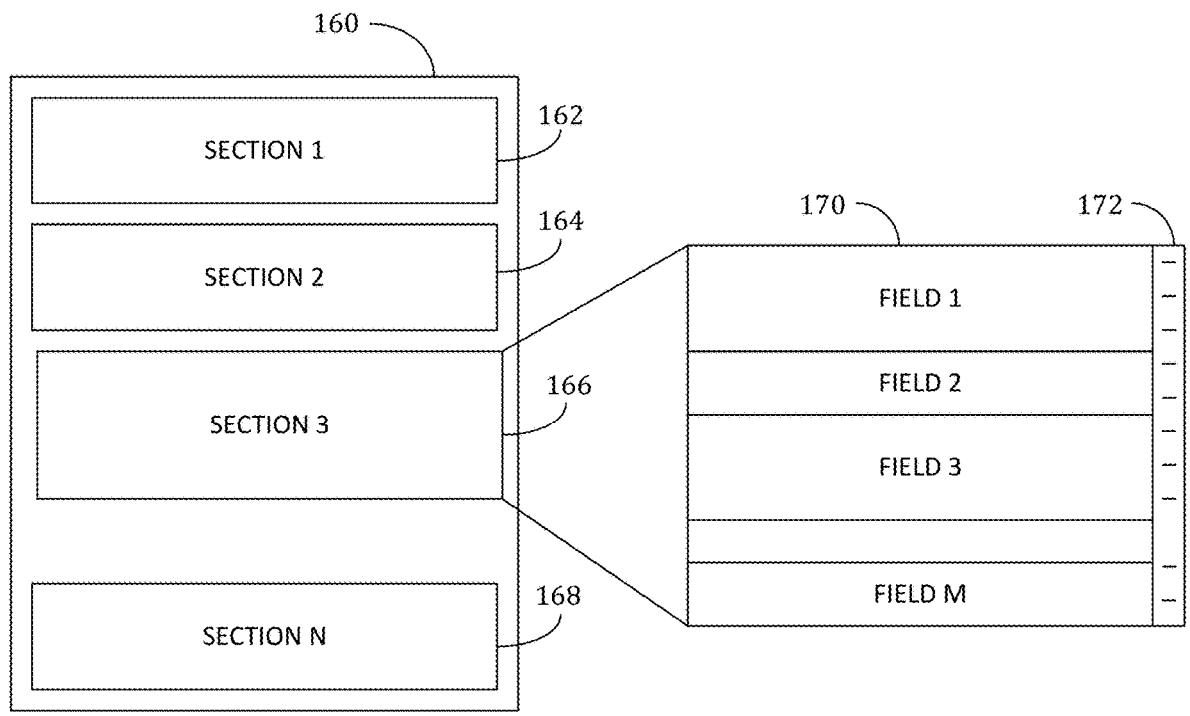
FIG. 4 illustrates a graphical representation of the resume architecture and spacing allocation.

In the example of a one-page resume, FIG. 4 illustrates a graphical representation of the spacing breakdown performed by subsequent processing operations. In FIG. 4, the resume 160 is shown as a single page resume. This resume 160 has a defined height and length, representing the available real-estate for a single page document. In this example, the document may be a standard page such as an 11" by 8.5" paper.

The resume 160 is divided into a number of sections 162-168. The section N represents any suitable integer. These sections can be fairly standard in resumes, such as sections for: contact info; education; work experience; interests; etc.

The resume 160 includes a set number of lines based on spacing requirements, font and character settings, and other factors. Those total lines are the subdivided on a per section basis.

In FIG. 4, section 3, 166, is visible in an exploded view as being broken down into fields 170. In this example, content section 3, 166, includes M number of fields, where M is any suitable integer. Also visible, the content section has a set number of lines 172. These lines 172 are then distributed amongst the fields.

In varying embodiment, the spacing and formatting of content can be based on guidance from one on more experts, such as educational counselors, human resource professional, etc. Thereby, spacing and formatting of content can be optimized in ways that consistent with industry and professional practices and norms.

By way of example, the resume 160 can include section 1, 162, displaying name and contact information, section 2, 164, displaying education background, and section 3, 166, displaying work experience. As being subdivided, the work experience content section is then divided into separate fields indicating separate jobs or other experience entries.

The method and system, as described herein, effectuates generation of the resume by facilitating entrance of the per-field entries, managing the content and spacing, to then electronically generate the resume.

Figure 5:
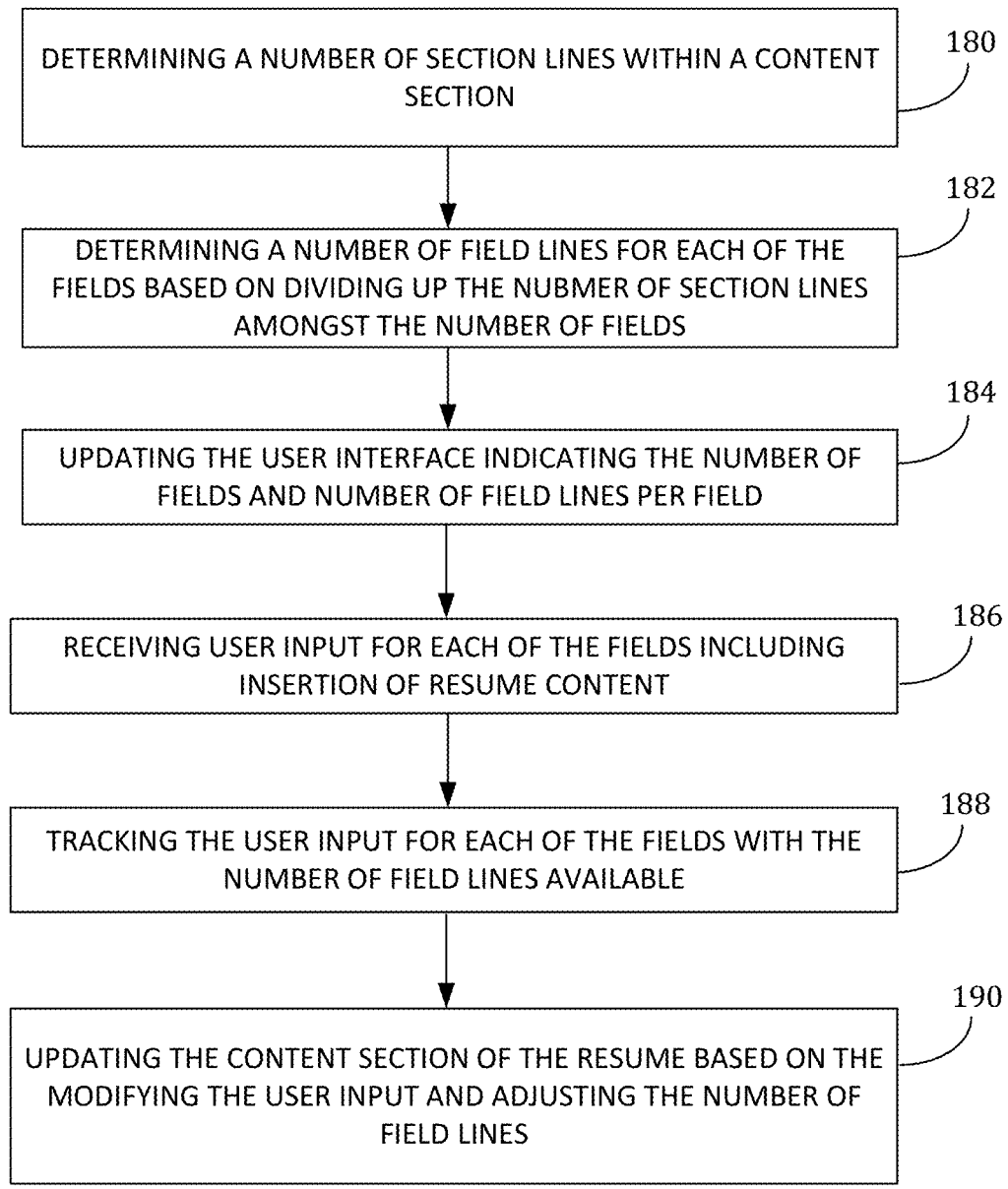
FIG. 5 illustrates a flowchart of the steps of one embodiment of a method for electronic management of input content for a computer-generated resume via an electronic user interface.

FIG. 5 illustrates a flowchart of the steps of one embodiment of a method and system for electronic management of input content for a computer-generated resume. The steps of FIG. 5, and additional steps described herein, can be part of one or more computing algorithms performing executable operations in processing environments consistent with FIGS. 1-4 above.

Step 180 is determining a number of section lines within a content section. For example, FIG. 4 shows the resume having a number of sections, each section having a number of section lines.

The content section is divisible into fields. Step 182 is determining a number of field lines for each of the fields based on dividing up the number of section lines amongst the number of fields.

This division of the number of section lines into separate values for each of the different fields can be done via an automated process or with additional user input. As noted further below, these initial divisions are adjustable based on interactions with users, so the determining of field lines for each of the plurality of fields can be a starting or default assignment.

For example, a default setting can be to equally divide the total number of lines in the content section amongst the fields, with remainder lines individually added one per field, top down. Using an example with numbers, if the content section has 13 lines and 4 fields, all fields are defaulted to 3 lines with the first field assigned the remainder line.

In the embodiment of user inquiry, the user interface could interact with the user via questions or other guided instructions. For example, the system in FIG. 3 could use interactive features from the resume generation module 134 accessing assembly assistance content 144 data. One example can be a video describing the value of professional experiences and how to determine what experiences qualify for including on a resume. The video can be followed by one or more interactive questions to further assist the user. Based on interactions, the user or the system can generate the initial assignment of lines per field.

Step 184 provides for updating the electronic user interface to indicate the plurality of fields and the number of field lines per field. The processing operations occur via back-end processing and user interactions occur via user interfacing.

For further illustration, FIG. 6 illustrates a sample screenshot of an application for resume building. The screenshot includes an interactive interface relating to collecting user data for, in this case, a professional experience section of a resume. The FIG. 6 screenshot inquires on the number of professional experiences, the user able to select an appropriate number.

The FIG. 6 screenshot further includes descriptive text below the interface function describing a professional experience. This guides the user in the process of collecting information. Text-based instructions can additionally be supplemented with other support, such as a video.

As part of the content acquisition via user interface, FIG. 7 illustrates a screenshot for collecting experience-specific information. In this example, the user has chosen a number of experiences and now enters information specific to each of the experience fields.

The screenshots further illustrate the resume generation is subsequent to the electronic management of input content. After collection, this content then usable for generating the resume.

In the FIG. 7 screenshot, the user fills in various data fields. The data fields guide the user in the data collection process. Via the user interface, the user enters this information for the numerous experience sections. Any suitable data input techniques, alone or in combination, can be utilized for data entry. For example, for fields just as the industry type, this field can be a pull-down menu of various industries. Other fields can be data entry, allowing the user to type or otherwise enter, e.g. voice to text, data. Date fields can also be pull-down or can user a calendar overlay for selecting a specific date.

Figure 8:
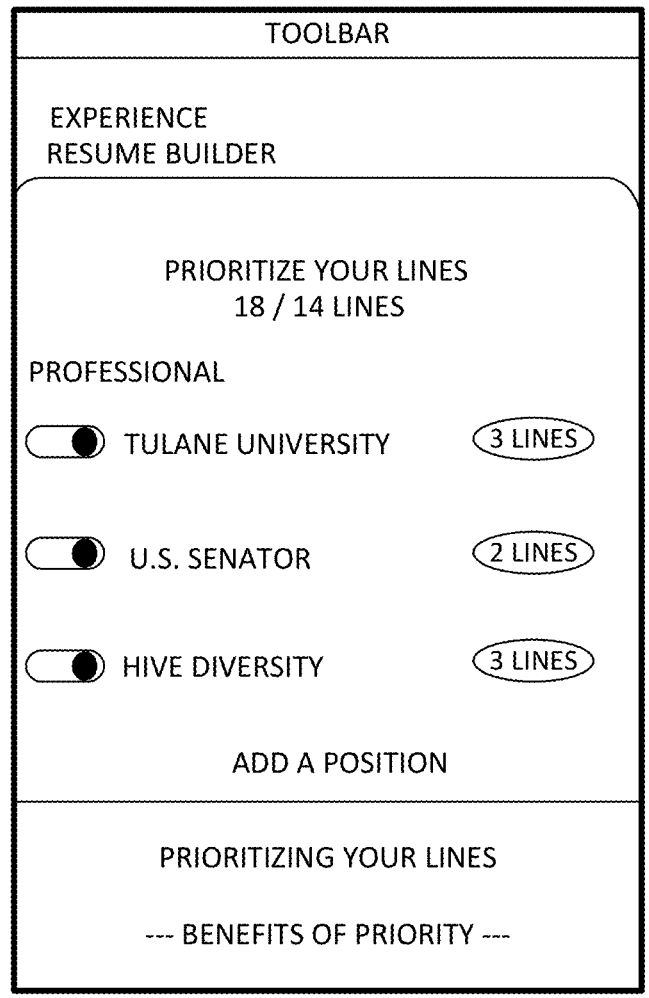

In FIG. 8, the screenshot illustrates steps 182-184. With knowledge of experience fields and a total number of available lines, the user interface displays the total number of lines and the division of lines per field. In this example, the total number of available lines is 14. The user has selected 6 work experiences, only the top three currently visible. Each field (work experience) is assigned a set number of lines, the total number of lines then noted as 18 lines of text out of 14 available lines.

Figure 9:
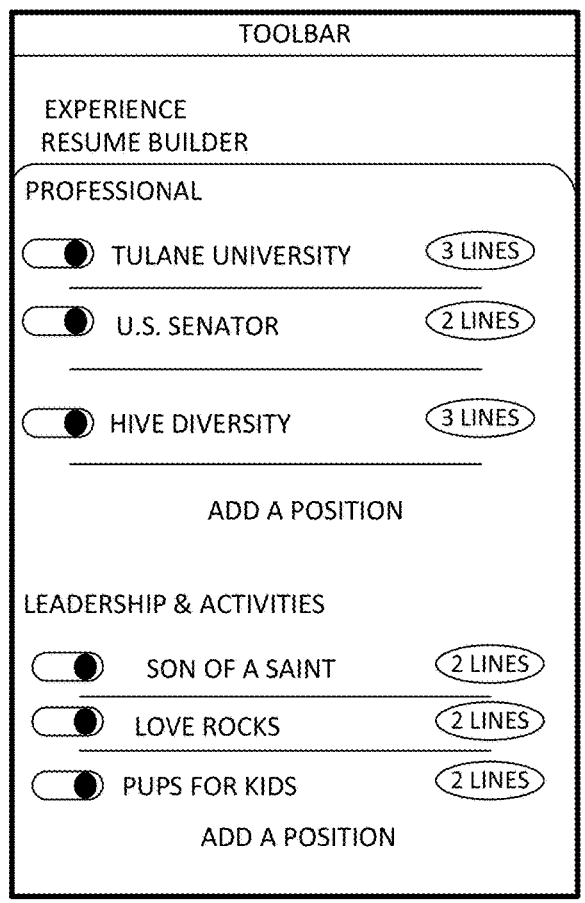

The user interface allows for further adjustments of the different fields in a dynamic manner. In one embodiment, the user can toggle on or off a particular field. For example, a slide bar interface shows in FIG. 9 the experience/activity "Pup for Kids" is on and then disengaged in FIG. 10. The user, selecting the toggle button can disable this field.

Another user interface embodiment can include direct user engagement of the lines field. For example, if all six fields are assigned three lines, FIG. 8 illustrates a modification of the U.S. Senator field from 3 lines to 2 lines. Via the user interface, the user can toggle the number of lines up or down. Upon completion of this toggling, this can update the total number of lines versus the available number of lines.

The user can dynamically manage the input content via the interface, management of the content also reflected in line spacing. For example, as a field is toggled off, those lines of text are then available. In the above example of 6 fields with a total of 18 lines of text, toggling off a field of 3 lines would then leave only 15 active lines of text. The user, via the interface, would need to eliminate one extra line of text to fit within the section spacing availability of 14 lines.

Figure 10:
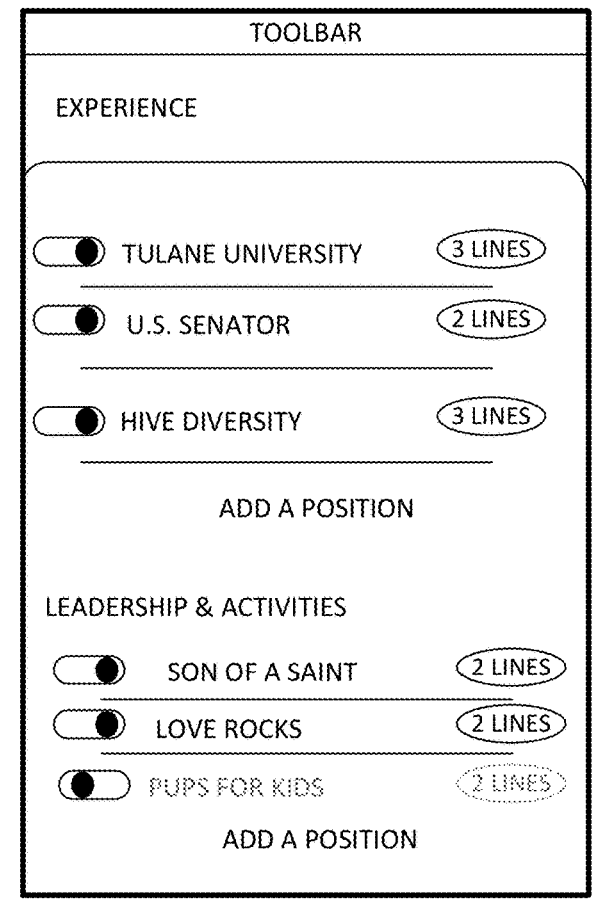

In the example of FIG. 10, by toggling off the Pup for Kids field, this would then leave 2 extra lines available as the active fields are allocated a total number of 12 lines out of the available 14. In this embodiment, the user can then increase the number of lines in any of the other fields without going over the total line limit for the content section.

Referring back to FIG. 5, step 186 is receiving user input for each of the fields including insertion of resume content. Prior to or concurrent with, assembly assistance can include instructional content to the user. For example, referring to FIG. 3, the processing module 130 can access resume language 140 and provide examples to the user of acceptable field content.

Figure 11:
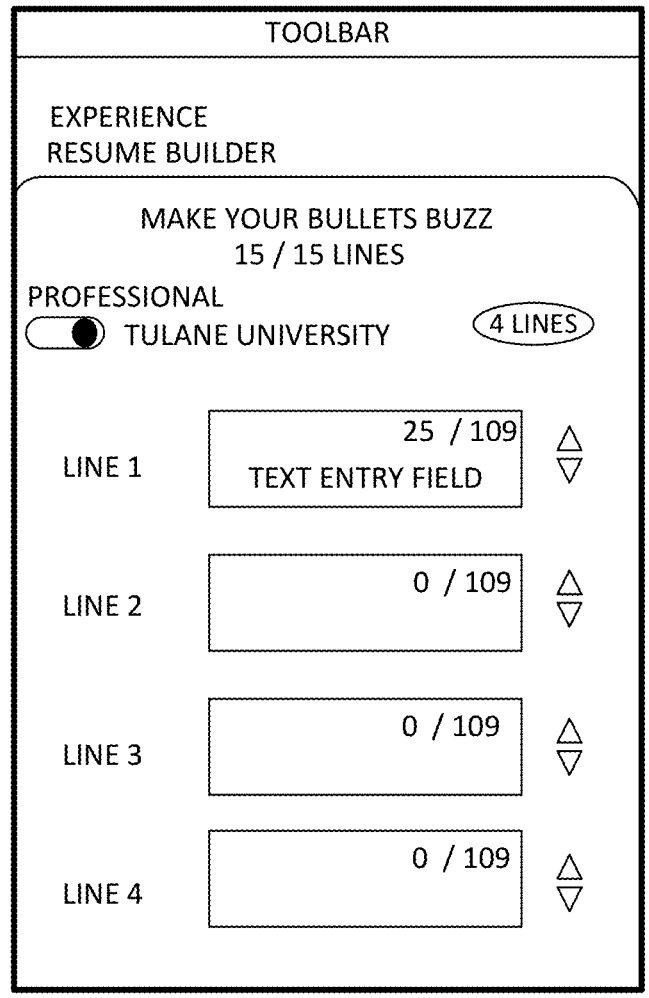

As noted above, FIG. 7 is one example of data entry, here using pull-down menus for receiving specific content. Additionally, FIG. 11 illustrates the user interface facilitating receipt of input content relative to available space. In this exemplary interface, the user enters descriptive language on a per line basis. In this example, there are three lines and therefore three fields for data entry.

Step 188 is tracking the user input for each of the fields with the number of field lines available. FIG. 11 further illustrates the user interface display tracking the user input. As the user enters free form text input, a tracker visually tracks the number of characters in relation to the number of available characters per line. In this example, a line is designated as allowing 100 characters. As the user types, the running tally is relative to the 100 limit.

In one embodiment, the tracking accounts for specifics of individual characters and how that relates to space availability. For example, capital letters take more space than lower case letters and symbols additionally alter spacing. Therefore, in one embodiment, the notation of available space is dynamically adjusted based detection of the type of characters being written.

Via the user interface managing input content, the user concerns themselves with input text into the boxes and not holistic concerns of resume formatting. The user can draft text for different boxes, adjusting as necessary based on the visual feedback of available spacing.

As the user enters text, referring back to FIG. 3, the processing model 130 can dynamically store user content into the database 142. For example, if a user toggles off a field (e.g. a specific experience entry), the user does not lose this input. Rather, upon toggling the field back on, the content is readily available.

The user can develop resume building on a more granular, per field, basis. The user can also create intent-specific resumes without having to rewrite various fields, such as toggling off or on different fields depending on the intended resume recipient.

In FIG. 5, the next step of the method is updating the content section of the resume based on modifying the user input and adjusting the number of field lines. Referring back to FIG. 4, the content section represents a large division of the resume, such as the example of a Professional Experience or an Education section. Changes made to each of the fields in the section and captured at the per-field level, but also tracked relative to the section overall.

The method and system can include additional steps for content management via the user interface. As part of the management of input content, the user interface can include various default settings, adjustable by the user. Part of a resume is sequencing of fields within a content section. The user interface may provide a default setting for prioritizing different fields, the user being able to modify these settings.

For example, the user interface can request the user to enter professional experiences. The user interface queries the user as to how many fields the user requests, as noted in FIG. 6. In this example, the user selects 4 professional experience fields, the system then sets the number of field at 4. For priority, the default can be prioritizing them originally by the order in which the user enters them via the interface or another default can be chronological.

The user interface therein allows for adjusting the priority. The user can enter a prioritization command accepting the original or default priority setting, or can manually adjust the priority. For example, a fourth field can be moved to the second priority, e.g. position, moving the second field to third and third field to fourth. As noted below, the priority of fields will be visible upon rendering of the formal resume. In one embodiment, movement of fields can be done via drag-and-drop operations or toggling arrows to move up/down.

The user interface can also modify prioritization or content quantity at the field level. Via the user interface, the user can change the number of lines per field, as well as change the ordering (priority) of the different fields.

The present method and system allows for interactive user input and managing the content. Upon completion of user input, the method and system therein electronically generates the resume. This processing steps collates the various user input data and formats into a unique resume document.

Varying embodiments can include additional processing steps to supplement or otherwise modify content. For example, different videos or other content can include tips on reviewing a completed resume. In another example, spell checking and other word processing tools can review the content, including for example seeking to avoid duplicative terms or non-professional vernacular, e.g. slang.

Management of the content includes actively tracking user input during the input phase, but also stored, cataloging, and dynamically assembling the resume. The resume is then assembled as a one-page or predetermined sized document. The resume can be a postscript or image file. The document can be made available for printing, to generate a physical file. The document can also be available for electronic delivery. The resume resides in a pre-formatted document constrained within its defined dimensions. The exemplary embodiment is a one-page resume, the resume being a single paged document visible or printable as a single page.

Figure 12:
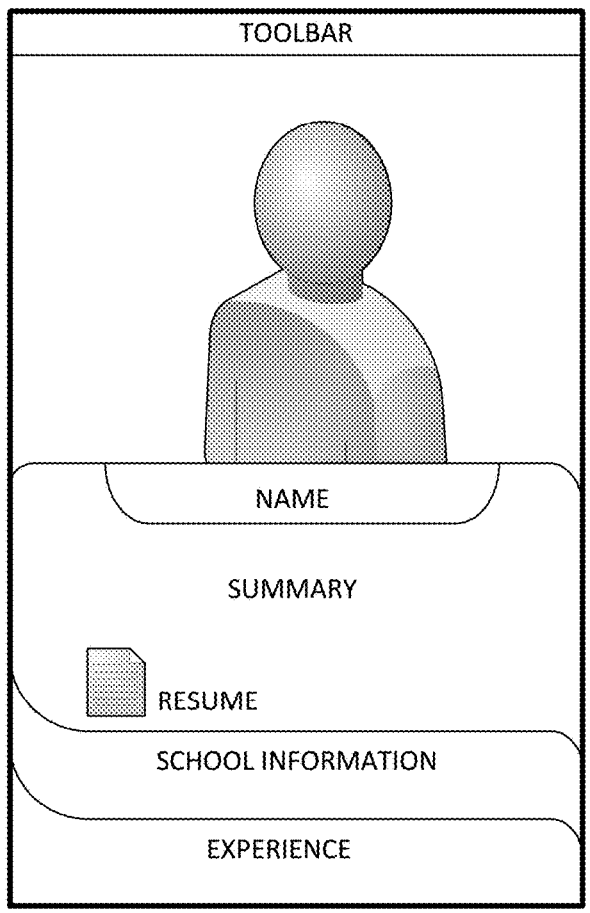

In addition to a predetermined sized resume, the method and system can further provide the user generated content within an electronic platform. FIG. 12 illustrates a sample screen shot of a profile page for a user including an image or an introduction video. The user can record the image or a video using known techniques.

The FIG. 12 screenshot also shows the user name, summary, and a link to accessing the formatted resume. Selecting the link may enable download or distribution of the resume, such as transmission in a postscript, PDF, or image format. The screenshot also illustrates the various fields associated with the user resume content, this content section of the screen is scrollable.

Figure 13:
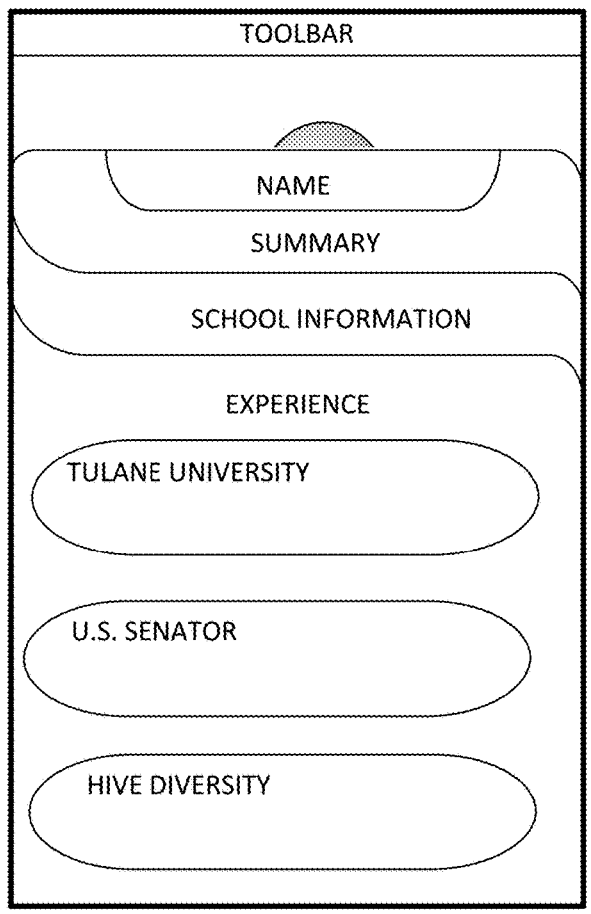

FIG. 13 illustrates a further screenshot, here the sections and fields expandable and collapsible. As the user navigates the online content, the information available in the resume is also visible in the electronic format. Whereby the data management method and system described herein provides for both concise content within the electronic resume, but also content mirroring the formatted resume available for download or distribution.

Herein the method and system operates for data management by tracking character counts relative to available space. The user focused on data entry, the processing operations receive and format data into the resume. The user interface guides the user in the data entry, with dynamic line and character tracking, for generating the subsequent resume.

A resume can have any number of sections, including a header, education, experience, leadership and other activities, and skills and interests. The method and system provides for data management for content entry for the leadership section. This method and system is equally applicable to any other section, including for example leadership sections.

Dynamically managing user input accounts for: content sections; fields per content sections; and line per field. Dynamic management further accounts a number of characters entered per line. Via the user interface, users can actively manage not only prior to data entry, but during data entry, as well as after data entry. The user interface allows for dynamic modifications of input content with back-end storage of entered content, avoiding user re-entry.

From the data management, the method and system then collates data to generate the document of a predetermined size for physical distribution.

In further embodiments, the method and system can include user interface elements for electronic submission of a resume to one or more opportunities. An employer or other entity reviewing resumes can then access the resumes via the method and system to review and further search or narrow down, such as creating a short list of candidates.

The method and system electronically collects, manages, and collates resume content using back-end processing routines. Further embodiments allow for additional interactions and tailoring of content. This improves the chances of success for users as job candidates. This also improves the ability for an employer or other user of the processing system to find the best candidate(s).

For example, one embodiment can include refinement of user content based on resume-seeker preferences. As used herein, a resume-seeker can be any suitable entity or user seeking resumes using the electronic platform described herein. On such example may be an employer seeking applicants for a job opening. Another example may be an educational system seeking enrollment.

The method and system can facilitate resume building based on the resume-seeker preferences. These preferences can be general to the resume, as well as specific to sections within the resume.

For example, the preferences can be incorporated within the resume generation module 134 of FIG. 3. The resume-seeker can enter or request preferences, whereby the user can either construct a new resume consistent with these preferences or the user can edit or modify an existing resume based on these preferences.

Adjustment of resume content can include modification of sections and or lines. For example, if an employer seeks candidates for a highly technical job position, the preferences can prioritize education and direct the user to enter class experiences and learning more prominently within the resume. In this example, the references could instruct the user, when constructing the resume, to enter course work and grades specific to an associated areas of study. In this example, the references could instruct the user to prioritize relevant work experience(s) relative to a field of knowledge or experience.

Via the resume-seeker preferences, the users can then be instructed to tailor content his or her content. The preferences can instruct via presetting terms within section(s) or field(s). For example, the prioritizing of lines in FIG. 8 can include written instructions on specific prioritizations. In another example, the initial setting of lines within a section can be tailor to emphasize one section over another, e.g. presetting a larger number of lines to an education section versus an experience section.

The preferences can additionally include unique or specific user interface menus for tailoring content, such as pop-up menus with course work. In this example, the resume-seeker can provide specific coursework for the user to include, for example chemistry coursework for resumes seeking work as a lab technician or biology and physiology coursework for resumes seeking work in a healthcare field.

The resume platform can be interactive between the resume-seekers and the users. For example, resume-seekers may request users to specifically apply to a position, the resume-seeker then requesting an updated or modified resume based on these additional preferences. The user can construct the resume using the above described system and method, as well as submitting the resume directly via the platform.

FIGS. 1 through 13 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized method for electronic management of input content for a computer-generated resume via an electronic user interface, the resume having a plurality of content sections, the method comprising:
   determining a number of section lines within a content section of the plurality of content sections;
   the content section including a plurality of fields, determining a number of field lines for each of the plurality of fields based on dividing up the number of section lines amongst the plurality of fields, wherein the number of section lines and the number of fields lines are limited based on a predetermined sizing restriction for the computer-generated resume;
   updating the electronic user interface to update a display on the user interface indicating the plurality of fields and the number of field lines for each of plurality of fields;
   via the user interface, receiving user input for each of the plurality of fields;
   concurrent with the receiving of the user input for each of the plurality of fields, tracking the user input for each of the plurality of fields relative to the number of field lines for each of the plurality of fields;
   further updating the display indicating the plurality of fields and the number of fields lines for each of the plurality of fields;
   managing an electronic generation of the computer-generated resume by interacting with the user via the user interface to modify the user input and dynamically adjust the number of field lines for one or more of the fields; and
   updating the content section of the computer-generated resume based the modifying the user input and adjusting the number of field lines.

2. The computerized method of claim 1 further comprising:
   presenting an inquiry to the user via the user interface regarding a number of requested fields within content section; and
   defining the plurality of fields as a first number of fields based on the number of requested fields.

3. The computerized method of claim 2 further comprising:
   receiving a prioritization command via the user interface for prioritizing each of the plurality of fields; and
   managing the electronic generation of the computer generated resume with accounting for the prioritization command including managing a hierarchical sequence of the plurality of fields within the content section.

4. The method of claim 2 further comprising:
   receiving a prioritization command via the user interface for prioritizing each of the plurality of fields, wherein the determining the number of field lines uses the prioritization command.

5. The method of claim 4 further comprising:
   modifying the number of field lines based on at least one of: the prioritization command or a user line adjustment request.

6. The method of claim 1 further comprising:
   receiving the user input for each of the plurality of fields with textual input of user generated content; and
   tracking the user input for each of the plurality of fields with tracking a number of characters of the textual input relative to the number of field lines.

7. The method of claim 1 further comprising:
   converting the textual input into resume content within the plurality of fields; and
   generating a formatted resume document having a format available for distribution via both electronic format and physical format.

8. The method of claim 1, wherein the content section is an experience section of the computer-generated resume.

9. The method of claim 1 further comprising:
   concurrent with receiving user input for each of plurality of fields, presenting interactive content relating to resume content generation to the user via the user interface.

10. The computerized method of claim 1, wherein the predetermining sizing restriction for the computer-generated resume is for generating a physical copy of a one page resume.

11. A system for electronic management of input content for a computer-generated resume via an electronic user interface, the resume having a plurality of content sections, the system comprising:
- a storage device having executable instructions stored therein; and
- at least one processing device, in response to the executable instructions, operative to:
- determine a number of section lines within a content section of the plurality of content sections;
- the content section including a plurality of fields, determine a number of field lines for each of the plurality of fields based on dividing up the number of section lines amongst the plurality of fields, wherein the number of section lines and the number of fields lines are limited based on a predetermined sizing restriction for the computer-generated resume;
- update the electronic user interface indicating the plurality of fields and the number of field lines for each of plurality of fields;
- via the user interface, receive user input for each of the plurality of fields;
- concurrent with the receiving of the user input for each of the plurality of fields, track the user input for each of the plurality of fields relative to the number of field lines for each of the plurality of fields;
- further update the display indicating the plurality of fields and the number of fields lines for each of the plurality of fields;
- manage an electronic generation of the computer-generated resume by interacting with the user via the user interface to modify the user input and adjust the number of field lines for one or more of the fields; and
- update the content section of the computer-generated resume based the modifying the user input and adjusting the number of field lines.

12. The system of claim 11, the processing device, in response to the executable instructions, further operative to:
- present an inquiry to the user via the user interface regarding a number of requested fields within content section; and
- define the plurality of fields as a first number of fields based on the number of requested fields.

13. The system of claim 12, the processing device, in response to the executable instructions, further operative to:
- receive a prioritization command via the user interface for prioritizing each of the plurality of fields; and
- manage the electronic generation of the computer generated resume with accounting for the prioritization command including managing a hierarchical sequence of the plurality of fields within the content section.

14. The system of claim 12, the processing device, in response to the executable instructions, further operative to:
- receive a prioritization command via the user interface for prioritizing each of the plurality of fields, wherein the determining the number of field lines uses the prioritization command.

15. The system of claim 14, the processing device, in response to the executable instructions, further operative to:
- modify the number of field lines based on at least one of: the prioritization command or a user line adjustment request.

16. The system of claim 11, the processing device, in response to the executable instructions, further operative to:
- receive the user input for each of the plurality of fields with textual input of user generated content; and
- track the user input for each of the plurality of fields with tracking a number of characters of the textual input relative to the number of field lines.

17. The system of claim 11, the processing device, in response to the executable instructions, further operative to:
- convert the textual input into resume content within the plurality of fields; and
- generate a formatted resume document having a format available for distribution via both electronic format and physical format.

18. The system of claim 11, wherein the content section is an experience section of the computer-generated resume.

19. The system of claim 11, the processing device, in response to the executable instructions, further operative to:
- concurrent with receiving user input for each of plurality of fields, present interactive content relating to resume content generation to the user via the user interface.

20. The system of claim 11, wherein the predetermined sizing restriction for the computer-generated resume is for generating a physical copy of a one-page resume.

* * * * *